(12) United States Patent
Chockalingam et al.

(10) Patent No.: US 7,301,915 B2
(45) Date of Patent: *Nov. 27, 2007

(54) SYSTEM AND METHOD FOR RESOLVING FREQUENCY AND TIMING UNCERTAINTY IN ACCESS TRANSMISSIONS IN A SPREAD SPECTRUM COMMUNICATION SYSTEM

(75) Inventors: Ananthanarayanan Chockalingam, San Diego, CA (US); Nathan E. Tenny, Poway, CA (US); David S. Miller, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 851 days.

This patent is subject to a terminal disclaimer.

(21) Appl. No.: 10/074,060

(22) Filed: Feb. 11, 2002

(65) Prior Publication Data
US 2002/0154608 A1 Oct. 24, 2002

Related U.S. Application Data

(63) Continuation of application No. 09/140,936, filed on Aug. 27, 1998, now Pat. No. 6,381,225.

(51) Int. Cl.
*H04B 7/185* (2006.01)
(52) U.S. Cl. ............ 370/316; 375/326; 455/12.1
(58) Field of Classification Search ........ 370/203–211, 370/316, 319, 321, 324, 330, 343, 350, 436, 370/478, 480
See application file for complete search history.

(56) References Cited

U.S. PATENT DOCUMENTS

| | | | |
|---|---|---|---|
| 3,864,634 A | 2/1975 | Dragonetti | 325/419 |
| 4,567,588 A | 1/1986 | Jerrim | 370/18 |
| 4,621,365 A | 11/1986 | Chiu | 375/1 |
| 4,653,076 A | 3/1987 | Jerrim et al. | 375/115 |
| 5,095,538 A | 3/1992 | Durboraw, III | 455/71 |
| 5,103,459 A | 4/1992 | Gilhousen et al. | 375/1 |
| 5,490,165 A | 2/1996 | Blakeney, II et al. | 375/205 |
| 5,613,193 A | 3/1997 | Ishikawa et al. | 455/12.1 |
| 5,666,122 A | 9/1997 | Carter | 342/357 |
| 5,742,908 A | 4/1998 | Dent | 455/517 |
| 5,805,648 A | 9/1998 | Sutton | 375/367 |
| 5,862,172 A | 1/1999 | Sugita et al. | 375/200 |
| 5,907,813 A * | 5/1999 | Johnson, Jr. et al. | 455/502 |

(Continued)

FOREIGN PATENT DOCUMENTS

EP 0337269 4/1989

(Continued)

*Primary Examiner*—Chi Pham
*Assistant Examiner*—Phuc Tran
(74) *Attorney, Agent, or Firm*—Jae-Hee Choi; Ashish Patel; Thomas Rouse

(57) ABSTRACT

A method for reducing the number of required frequency and time hypotheses to acquire an access transmission in a satellite communication system. By reducing the number of required hypotheses, the amount of hardware required to acquire the access transmission is reduced. The method of the present invention reduces the number of required hypotheses by reducing the range of possible frequency and timing values of the access transmission. The range of possible frequency and timing values is reduced by determining the frequency and time uncertainties over individual satellite beams rather than over an entire satellite footprint.

24 Claims, 11 Drawing Sheets

U.S. PATENT DOCUMENTS 6,167,056 A * 12/2000 Miller et al. ................ 370/441
6,381,225 B1 * 4/2002 Chockalingam et al. .... 370/316

FOREIGN PATENT DOCUMENTS

| WO | 9608882 | 3/1996 |
| WO | 9720402 | 6/1997 |
| WO | 9849857 | 11/1998 |

* cited by examiner

SYSTEM AND METHOD FOR RESOLVING FREQUENCY AND TIMING UNCERTAINTY IN ACCESS TRANSMISSIONS IN A SPREAD SPECTRUM COMMUNICATION SYSTEM

CROSS-REFERENCE TO RELATED APPLICATIONS

This patent application is a continuation of U.S. patent application Ser. No. 09/140,936, filed Aug. 27, 1998, now U.S. Pat. No. 6,381,225, which is related to the following commonly owned, patent application Ser. No. 6,044,074 issued Mar. 28, 2000, which is incorporated herein by reference.

BACKGROUND OF THE INVENTION

I. Field of the Invention

The present invention relates generally to the field of wireless communications. More particularly, the present invention relates to resolving frequency and timing uncertainty in access channel transmissions in a spread spectrum communication system.

II. Related Art

Typical wireless satellite-based communications systems include base stations referred to as gateways, and one or more satellites to relay communications signals between the gateways and one or more user terminals. Gateways provide communication links for connecting a user terminal to other user terminals or users of other communications systems, such as a public telephone switching network. User terminals can be fixed or mobile, such as a mobile or portable telephone. They may be located near or remote from a gateway.

Some satellite communications systems employ code division multiple access (CDMA) spread-spectrum signals, such as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, which issued Nov. 25, 1998, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

In satellite communication systems employing CDMA, separate communication links are used to transmit communication signals, including paging, access, messaging, or traffic signals, to and from a gateway or base station. A forward communication link refers to communication signals originating at a gateway or base station and transmitted to a user terminal. A reverse communication link refers to communication signals originating at a user terminal and transmitted to a gateway or base station.

The reverse link is comprised of at least two separate channels: an access channel and a reverse traffic channel. The access channel is used by a user terminal to "access" a gateway. A user terminal accesses a gateway to register with the system, to place a call, or to acknowledge a paging request sent by the gateway. A user terminal communicates with a gateway on the access channel by transmitting a signal referred to as an "access probe" to the gateway. An access probe is a transmission of data on the access channel that contains an access message. The contents of the access message depend on whether the user terminal is initiating a call, registering with the system, or responding to a page.

In a typical spread spectrum communications system, one or more preselected pseudo noise (PN) code sequences are used to "spread" information signals, such as an access probe, over a predetermined spectral band prior to modulation onto a carrier signal for transmission as communications signals. PN code spreading, a method of spread spectrum transmission that is well known in the art, produces a signal for transmission that has a bandwidth much greater than that of the data signal.

In order for a gateway to acquire an access probe sent by a user terminal (i.e., recover the access message within the access probe), the gateway must first demodulate the communication signal to recover the PN modulated access probe, and then despread the message portion of the access probe. In order for the gateway to demodulate the carrier, the gateway must be tuned to the carrier frequency of the communication signal. Without reasonably accurate frequency tuning, the carrier cannot be properly demodulated. Furthermore, because PN spreading codes are applied to the access probe, the arrival time of the access probe must be determined to properly despread the access probe to recover the information contained therein. PN spreading codes cannot be accurately removed without appropriate system timing or signal synchronization. If the codes are applied with incorrect time synchronization, the communication signals will simply appear as noise and no information is conveyed.

Communication systems employing satellites with non-geostationary orbits exhibit a high degree of relative user terminal and satellite motion. The relative motion creates fairly substantial Doppler components or shifts in the carrier frequency of signals within the communication links. Because these Doppler components vary with user terminal and satellite motion, they create a range of uncertainty in the frequency of the carrier signal, or more simply, frequency uncertainty. Similar effects may be observed in terrestrial systems where the user terminal is moving at a high speed, such as when used on a high speed train or other vehicle.

The satellite motion also introduces Doppler into the PN spreading codes. This Doppler is referred to as code Doppler. In particular, code Doppler is the effect of the satellite motion introduced into the baseband signal. Code Doppler shifts the frequency of the transitions between adjacent codes in the PN spreading code sequences. Thus, the adjacent codes do not arrive at the receiver with a correct code timing.

In addition to code Doppler, the satellite motion also creates a large amount of uncertainty in the propagation delay, or timing uncertainty, for signals within the communication links. For signals arriving at the gateway, the propagation delay varies from a minimum when the satellite is directly overhead of the gateway to a maximum when the satellite is at a horizon with respect to the gateway.

As stated above, in order for the gateway to acquire an access probe, the gateway must be tuned to the carrier frequency of the communication signal and synchronize timing with the signal. One way to tune the gateway to the carrier frequency and synchronize timing is to determine the carrier frequency and timing prior to the transmission of the communication signal and then tune the gateway appropriately. But because of the frequency and time uncertainty introduced into the communication signal by the Doppler effect and propagation delay, a gateway cannot determine the carrier frequency or signal arrival time prior to receiving the signal. Nevertheless, the gateway can determine the range of possible carrier frequencies and the range of possible arrival times by determining the amount of uncertainty introduced by the Doppler effect and propagation delay. Consequently, a gateway can acquire an access probe by "searching" for the correct frequency and timing by comparing the received communication signal with various frequency and timing values within their respective possible ranges.

These various frequency and timing values are termed frequency and timing hypotheses, respectively. The frequency and time hypothesis with the highest correlation to the received communication signal above a predetermined threshold provides frequency and timing values that can be used to demodulate and despread the signal, thereby enabling the gateway to recover the information within the access probe.

The amount of hardware that is required to "search" for the correct frequency and timing in a fixed amount of time is proportional to the number of required hypotheses, and the number of required hypotheses is a function of the range of time and frequency uncertainty. Because searcher hardware is expensive and because it is undesirable to increase the search time, a system and method to reduce the range of time and frequency uncertainty is therefore desired.

SUMMARY OF THE INVENTION

The present invention is directed toward acquiring a signal in a communication system that experiences Doppler and propagation delay due to relative motion of satellite repeaters and user terminals. Doppler effects and propagation delays introduce wide ranges of frequency uncertainty and timing uncertainty in the signals transmitted between the user terminals and the satellites and signals transmitted the satellites and the gateways. The present invention is aimed at reducing the range of frequency and timing uncertainty in the communication system. The present invention reduces the range of frequency and timing uncertainty by determining the frequency and time uncertainties over individual satellite beams rather than over an entire satellite footprint.

In one aspect the invention provides a method for acquiring a signal transmitted by a user terminal to a satellite and relayed by the satellite to a gateway. The method includes the steps of: (1) defining an arrival time and frequency search space for a communication beam associated with the satellite based on a predetermined beam coverage area of the communication beam; (2) searching the search space to resolve a timing and frequency uncertainty associated with the signal; and (3) demodulating a message portion of the signal based on a frequency increment and timing offset obtained as a result of resolving the timing and frequency uncertainty.

Preferably, the predetermined coverage region of the communication beam corresponds to an area defined by a range of azimuths and a range of elevations containing the nominal coverage region of the beam.

Advantageously, the signal transmitted by the user terminal includes a preamble portion as well as the message portion. In one embodiment, the preamble portion contains null data. Preferably, the preamble portion has a first stage modulated by a first signal and a second stage modulated by the first signal and a second signal. In one embodiment, the first signal and the second signal are pseudonoise (PN) code pairs.

According to one embodiment, the step of searching the search space includes the steps of: (1) performing a coarse search of the search space to resolve a frequency uncertainty associated with the signal; and (2) performing a fine search to resolve a timing uncertainty associated with the signal.

Preferably, the search space is defined by a range of frequencies and a range of arrival times.

In another aspect the present invention provides a method for recovering at a gateway information within a message portion of a signal transmitted by a user terminal and relayed by a satellite to the gateway. The method includes the steps of: (1) assigning an access channel receiver within the gateway to a beam associated with the satellite; (2) assigning a search space to the access channel receiver, where the search space corresponds to a frequency and timing uncertainty associated with the beam to which the access channel receiver is assigned; (3) searching the search space to acquire the signal; and (4) if the signal is acquired after searching the search space, demodulating the message portion of the signal to recover the information contained therein.

The invention also provides a system for recovering at a gateway information within a message portion of a signal transmitted by a user terminal to a satellite and relayed by the satellite to the gateway. The system includes an access channel receiver within the gateway that is assigned to a beam associated with the satellite. The system also includes a search space that is assigned to the access channel receiver. The search space corresponds to a frequency and timing uncertainty associated with the beam to which the access channel receiver is assigned. Lastly, the system includes a gateway demodulator for searching the search space to acquire the signal and for demodulating the message portion of the acquired signal to recover the information contained therein.

Preferably, the gateway demodulator includes means for performing a coarse search of the search space to resolve a frequency uncertainty associated with the signal and means for performing a fine search to resolve a timing uncertainty associated with the signal.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

I. Introduction

The present invention is particularly suited for use in communications systems employing Low Earth Orbit (LEO) satellites. The invention is also applicable to satellite systems in which the satellites travel in non-LEO orbits, or to non-satellite repeater systems, if there is sufficient relative motion between gateways or base stations and user terminals to impact the frequencies of the signals being received, or if there is sufficient uncertainty in the propagation delay of the signals.

The preferred embodiment of the invention is discussed in detail below. The present invention could find use in a variety of wireless information and communication systems, including those intended for position determination, and satellite and terrestrial cellular telephone systems. A preferred application is in CDMA wireless spread spectrum communication systems for mobile, portable, or fixed telephone service.

II. A Typical Satellite Communications System

Figure 1:
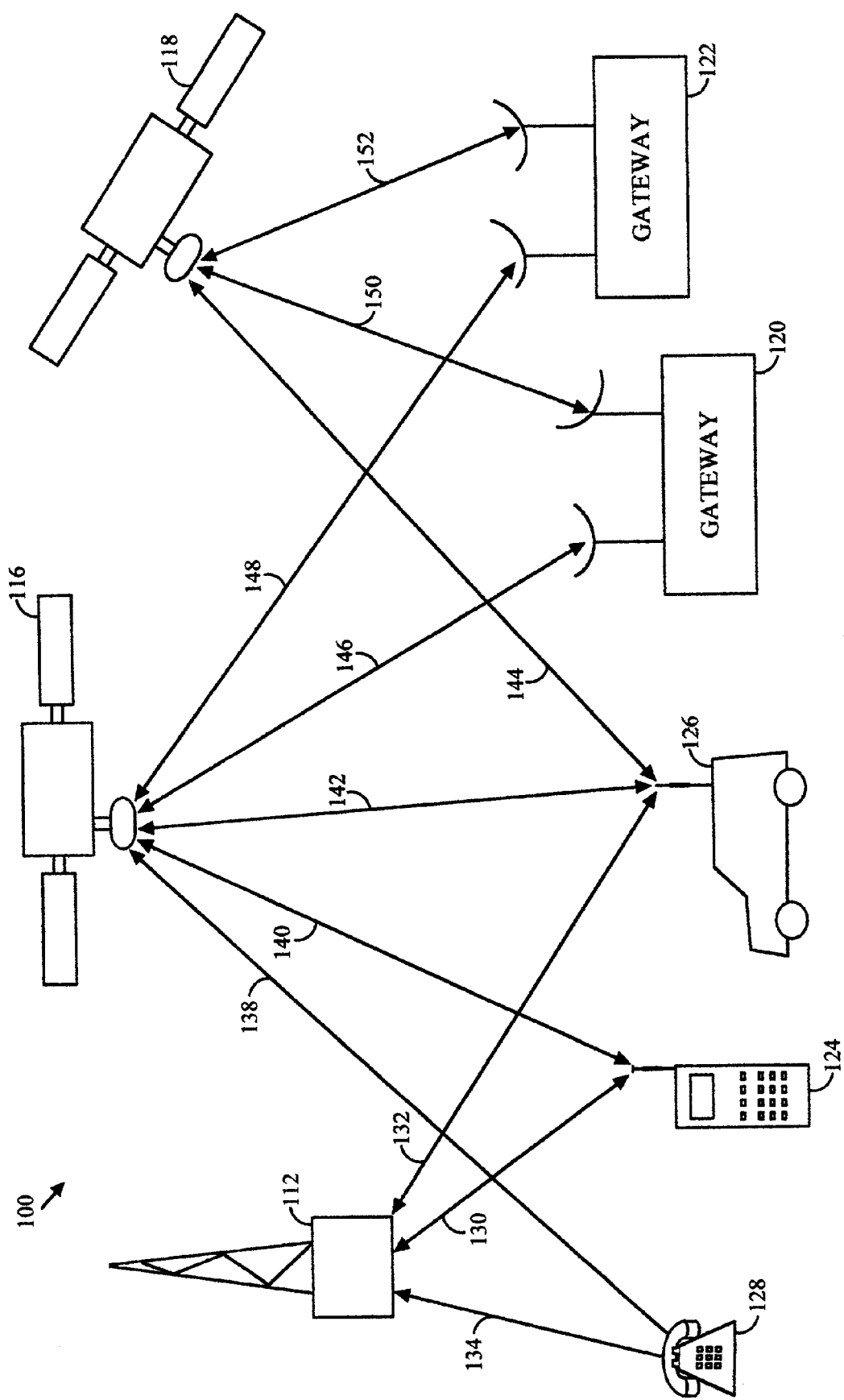
FIG. 1 illustrates an exemplary wireless communication system constructed and operating according to one embodiment of the present invention.

An exemplary wireless communication system in which the present invention is found useful, is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with three remote user terminals 124, 126, and 128. Typically, the base stations and satellites/gateways are components of separate communication systems, referred to as being terrestrial and satellite based, although, this is not necessary. The total number of base stations, gateways, or satellites in such systems depends on desired system capacity and other factors well understood in the art.

The terms base station and gateway are also sometimes used interchangeably, each being a fixed central communication station, with gateways being perceived in the art as highly specialized base stations that direct communications through satellite repeaters while base stations (also sometimes referred to as cell-sites) use terrestrial antennas to direct communications within surrounding geographical regions. Gateways have more 'housekeeping tasks,' with associated equipment, to maintain satellite communication links, and any central control centers also typically have more functions to perform when interacting with gateways and moving satellites. However, the present invention finds application in systems using either gateways or base stations as communication stations.

User terminals 124, 126, and 128 each include a wireless communication device such as, but not limited to, a cellular telephone, a data transceiver, or a paging or position determination receiver, and can be hand-held, vehicle-mounted or fixed as desired. Here, the user terminals are illustrated as hand-held, vehicle-mounted, and fixed telephones 124, 126, and 128, respectively. User terminals are sometimes also referred to as subscriber units or simply as 'users' in some communication systems, depending on preference.

Generally, beams from a beam source (such as base station 112 or satellites 116 and 118) cover different geographical areas in predefined patterns. Beams at different frequencies, also referred to as CDMA channels or 'subbeams', can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

While only two satellites are shown for clarity, a variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations. This includes other orbital distances and constellations, for example, those using geostationary satellites where beam-switching results mostly from user terminal motion. In addition, a variety of base station configurations can also be used.

FIG. 1 illustrates some possible signal paths for establishing communications between user terminals 124, 126, and 128 and base station 112, or through satellites 116 and 118, with gateways 120 and 122. The base station-user terminal communication links are illustrated by lines 130, 132, and 134. The satellite-user terminal communication links between satellites 116 and 118, and user terminals 124, 126, and 128 are illustrated by lines 138, 140, 142, and 144. The gateway-satellite communication links, between gateways 120 and 122 and satellites 116 and 118, are illustrated by lines 146, 148, 150, and 152. Gateways 120 and 122, and base station 112, may be used as part of a one-way or two-way communication system or simply to transfer messages/information or data to user terminals 124, 126, and 128.

III. Communication Links and Channels

Figure 2:
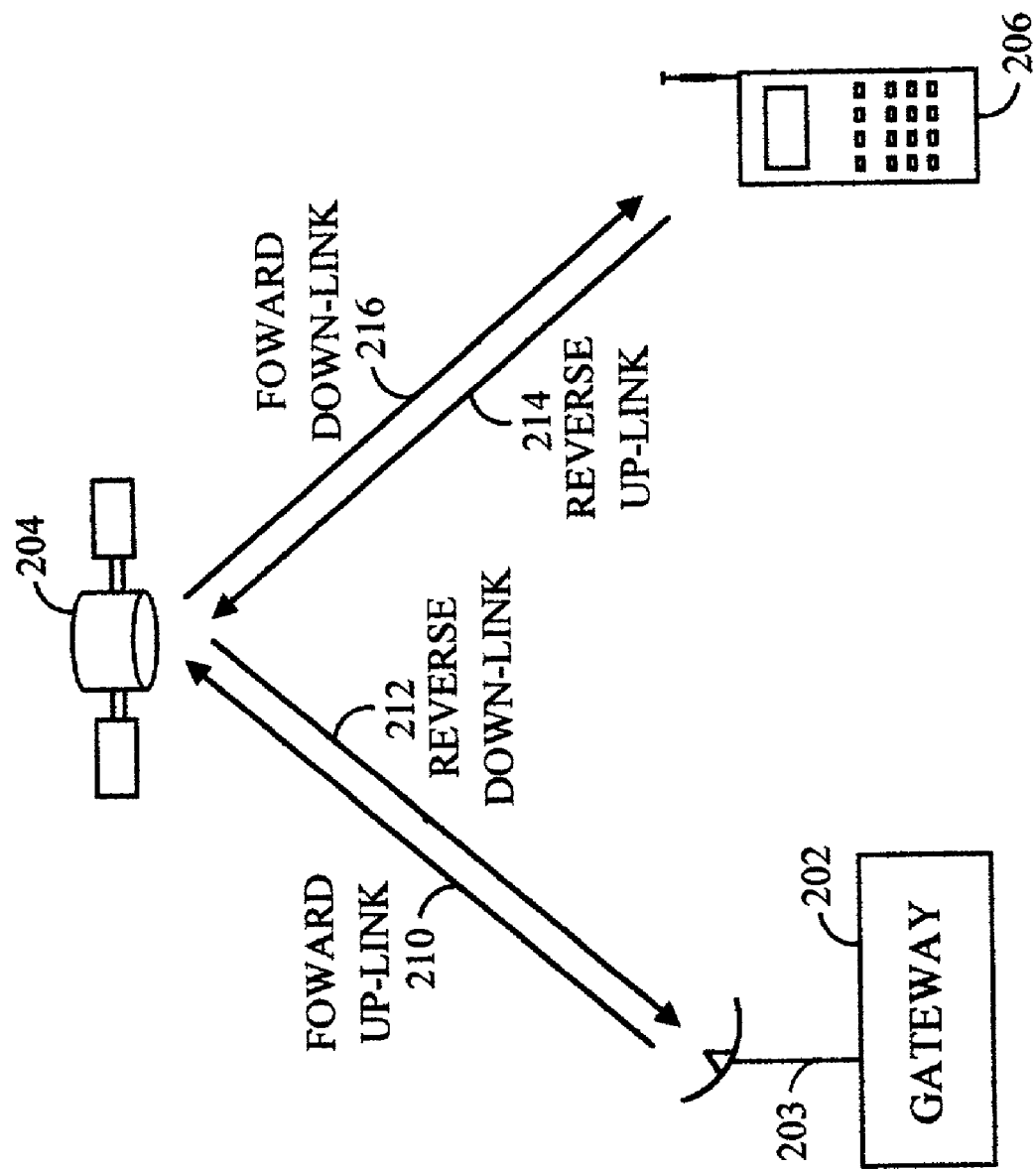
FIG. 2 illustrates an exemplary implementation of communication links used between a gateway and a user terminal in a communication system.

FIG. 2 illustrates an example implementation of communication links used between gateway 202 and satellite 204, and between satellite 204 and user terminal 206. As shown in FIG. 2, the example implementation utilizes four radio frequency links. The links between user terminal 206 and satellite 204 are the reverse up-link 214 and forward down-link 216. The links between gateway 202 and satellite 204 are the forward up-link 210 and reverse down-link 212.

Communication proceeds in the "forward" direction from gateway 202 on the forward up-link 210 and then down from satellite 204 to user terminal 206 on the forward down-link 216. In the "reverse" direction, communication proceeds up from user terminal 206 to satellite 204 on the reverse up-link 214 and then down from satellite 204 to gateway 202 on the reverse down-link 212.

Figure 3:
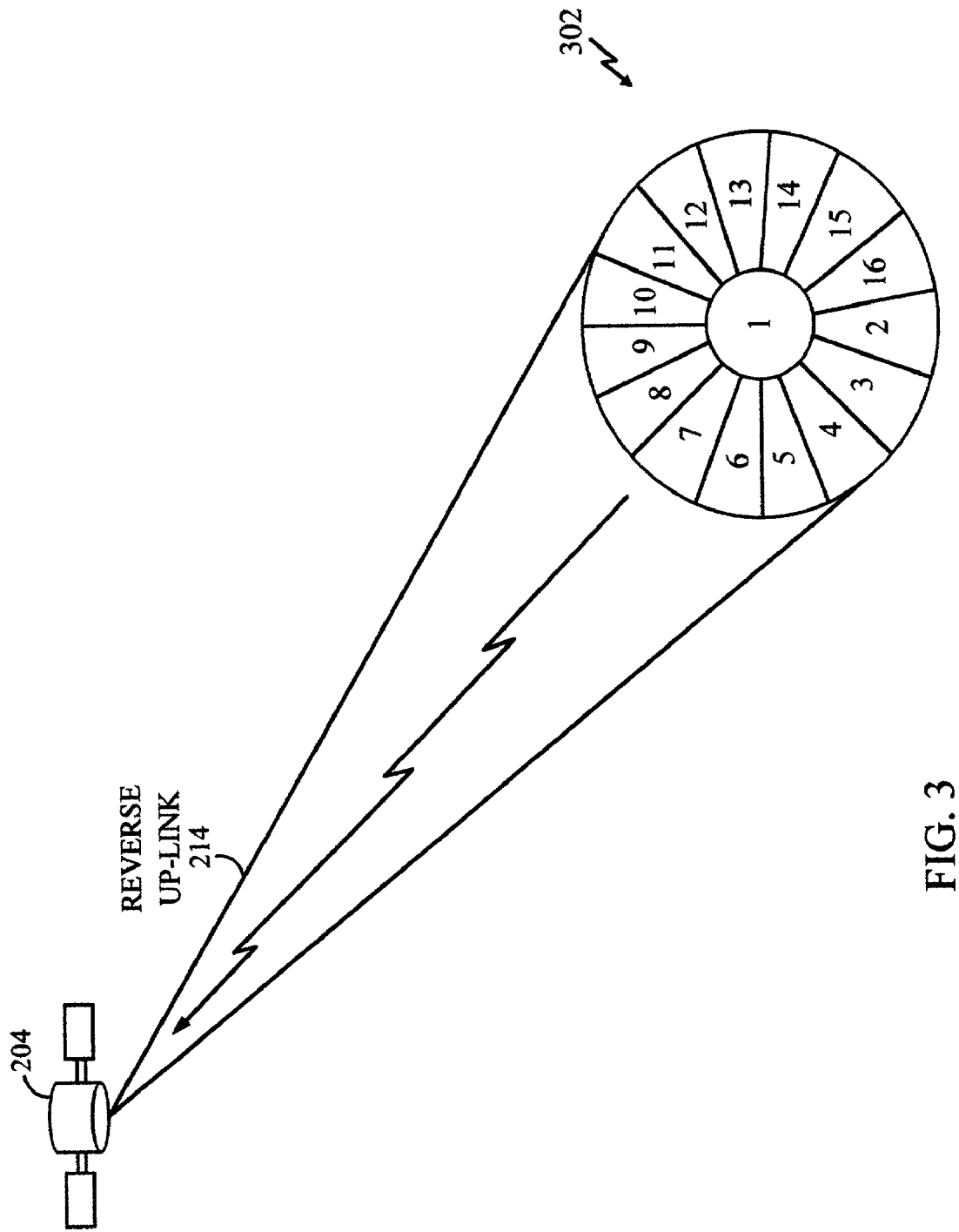
FIG. 3 illustrates an exemplary reverse up-link footprint.

In an exemplary communication system, the frequency of reverse up-link 214 ranges between 1610 and 1626.5 MHz, and the reverse up-link 214 has a footprint 302 that is spatially divided into sixteen beams, as shown in FIG. 3. The reverse up-link footprint 302 is divided into one inner beam (beam 1) and fifteen outer beams (beams 2–16). However, it should be apparent to one skilled in the relevant art that there are a number of equally valid ways to divide the reverse up-link footprint 302 and that which is illustrated in FIG. 3 is but one example.

Figure 4:
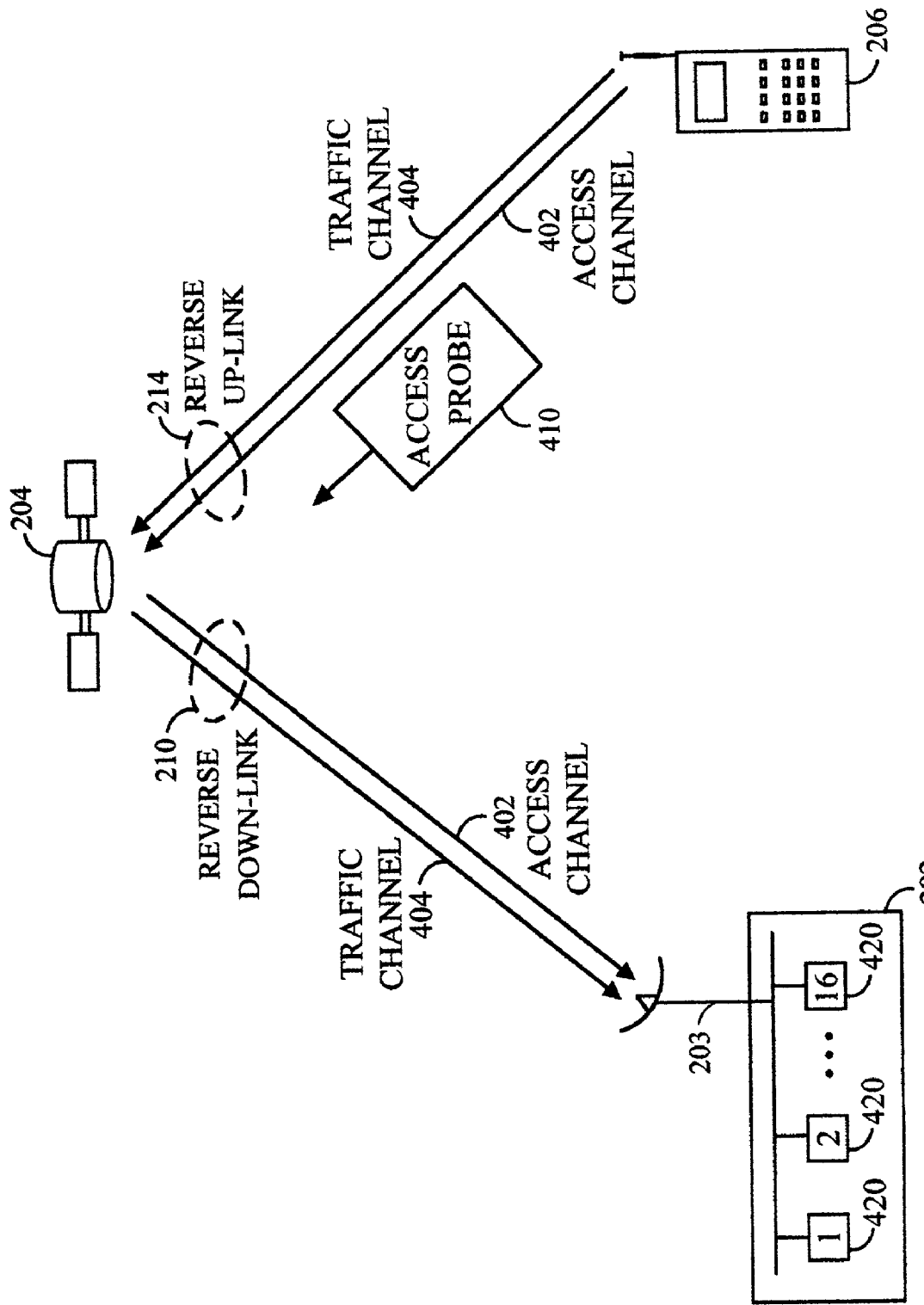
FIG. 4 illustrates exemplary channels that form a reverse up-link.

Reverse up-link 214 and reverse down-link 212 carry at least two channels: an access channel 402 and a reverse traffic channel 404, as shown in FIG. 4. Access channel 402 is used by user terminal 206 to send short messages to gateway 202. The short message contains information for initiating calls, responding to pages sent from gateway 202 to user terminal 206, and registering with gateway 202. The short messages transmitted from user terminal 206 to gateway 202 on the access channel are carried within a signal 410 broadcast by user terminal 206. This signal 410 is referred to as an "access probe."

Because user terminal 206 can be found within any one of the beams of the reverse up-link footprint 302 when user terminal 206 broadcasts access probe 410, and since gateway 202 doesn't track the position of user terminal 206, gateway 202 must monitor all of the beams for the arrival of access probe 410. Gateway 202, therefore, assigns an access channel receiver 420 to each one of the beams in the reverse link beam pattern 302. Each access channel receiver 420 continually "searches" on its assigned beam for the arrival of access probe 410, or other access probes from other user terminals.

IV. Access Channel Receiver Search Space

Due to propagation delay and well-known Doppler effect, access probe 410 received at gateway 202 has an arrival time and frequency uncertainty. That is, at the time access probe 410 arrives at an access channel receiver 420 within gateway 202, the access channel receiver 420 cannot know the exact frequency or timing of access probe 410. In order to eliminate this arrival time and frequency uncertainty, access probe 410 may be provided with a preamble to enable an access channel receiver 420 to "search" for access probe 410 within an assigned "search space" (also known as, "uncertainty space"), and thereby achieve time and frequency alignment.

Figure 5:
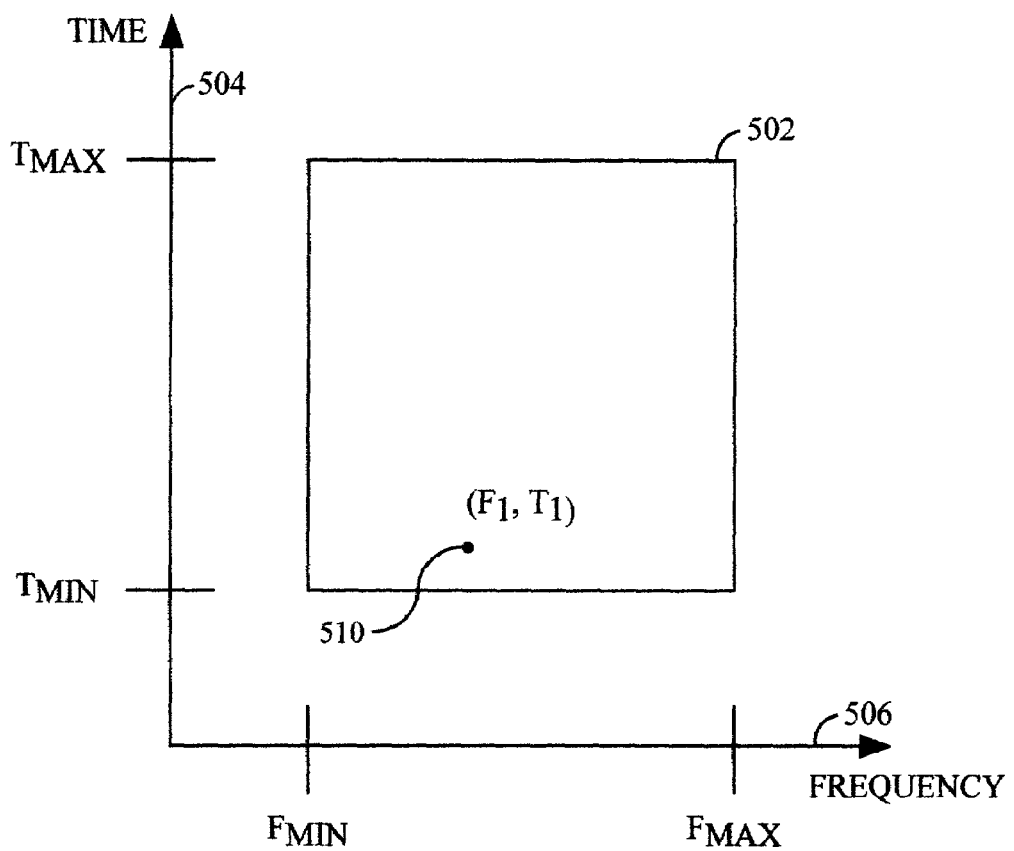
FIG. 5 illustrates an exemplary time/frequency search space.

A search space is defined by at least two components, a range of possible arrival times and a range of possible frequencies of arriving access probe 410. The search space is two dimensional, with arrival time being one dimension and frequency being the other. FIG. 5 illustrates an exemplary search space 502. The vertical axis 504 represents the arrival time of access probe 410 and the horizontal axis 506 represents the frequency of access probe 410. The arrival time of access probe 410 is bounded by a minimum arrival time ($T_{min}$) and a maximum arrival time ($T_{max}$). Similarly, the frequency of access probe 410 is bounded by a minimum frequency ($F_{min}$) and a maximum frequency ($F_{max}$). As shown in FIG. 5, search space 502 is the area bounded by the points $F_{min}$, $F_{max}$, $T_{min}$ and $T_{max}$.

Access channel receiver 420 "searches" search space 502 by correlating access probe 410 with various time and frequency hypothesis pairs, wherein all of the various time and frequency hypothesis pairs define a point within search space 502. An example time and frequency hypothesis pair 510 is shown in FIG. 5. The hypothesis pair within search space 502 that generates the highest correlation with received access probe 410 is the best estimate of access probe 410's arrival time and frequency. Once the arrival time and frequency uncertainty is resolved in this manner, access probe 410 is said to be acquired, and the information contained therein can be recovered.

The process for determining the search space to assign to each access channel receiver 420 is described below.

V. Arrival Time Search Space

The arrival time (T) of access probe 410 at gateway 202 can be determined by the following formula: $T=T_{su}+T_{us}+T_{sg}$. $T_{su}$ represents the time it takes a communication signal to go from a satellite handling a paging signal transfer (not shown) to user terminal 206; $T_{us}$ represents the time it takes a communication signal 410 to go from user terminal 206 to an access channel satellite 204; and $T_{sg}$ represents the time it takes communication signal 410 to go from the access channel satellite 204 to gateway 202.

To determine the range of possible values for T we need to determine the minimum and maximum possible arrival times ($T_{min}$ and $T_{max}$, respectively). The arrival time uncertainty space is all arrival times between and including $T_{min}$ and $T_{max}$. The maximal and minimal values of T occur when $T_{us}=T_{su}$, so, for purposes of determining uncertainty, we can assume this equality. It follows that $T=2T_{us}+T_{sg}$. Gateway 202 can determine $T_{sg}$ in advance because gateway 202 knows the position of the access channel satellite 204 relative to its own position with reasonable certainty. Consequently, the time uncertainty is the range of possible values of $2T_{us}$. That is, the arrival time uncertainty is: $2(T_{us-max}-T_{us-min})$.

$T_{us}$, the amount of time it takes access probe 410 to reach the access channel satellite 204 from user terminal 206, is directly proportional to the distance between user terminal 206 and satellite 204. In order for satellite 204 to receive access probe 410 from user terminal 206, and then relay it to gateway 202, user terminal 206 must be within footprint 302 of satellite 204. Because user terminal 206 must be within footprint 302, we can determine the minimum and maximum distance ($d_{min}$ and $d_{max}$, respectively) between user terminal 206 and satellite 204. Further, because the propagation speed of access probe 410 is a known constant, $T_{us-min}$ and $T_{us-max}$ can be derived once $d_{min}$ and $d_{max}$ are known.

Figure 6:
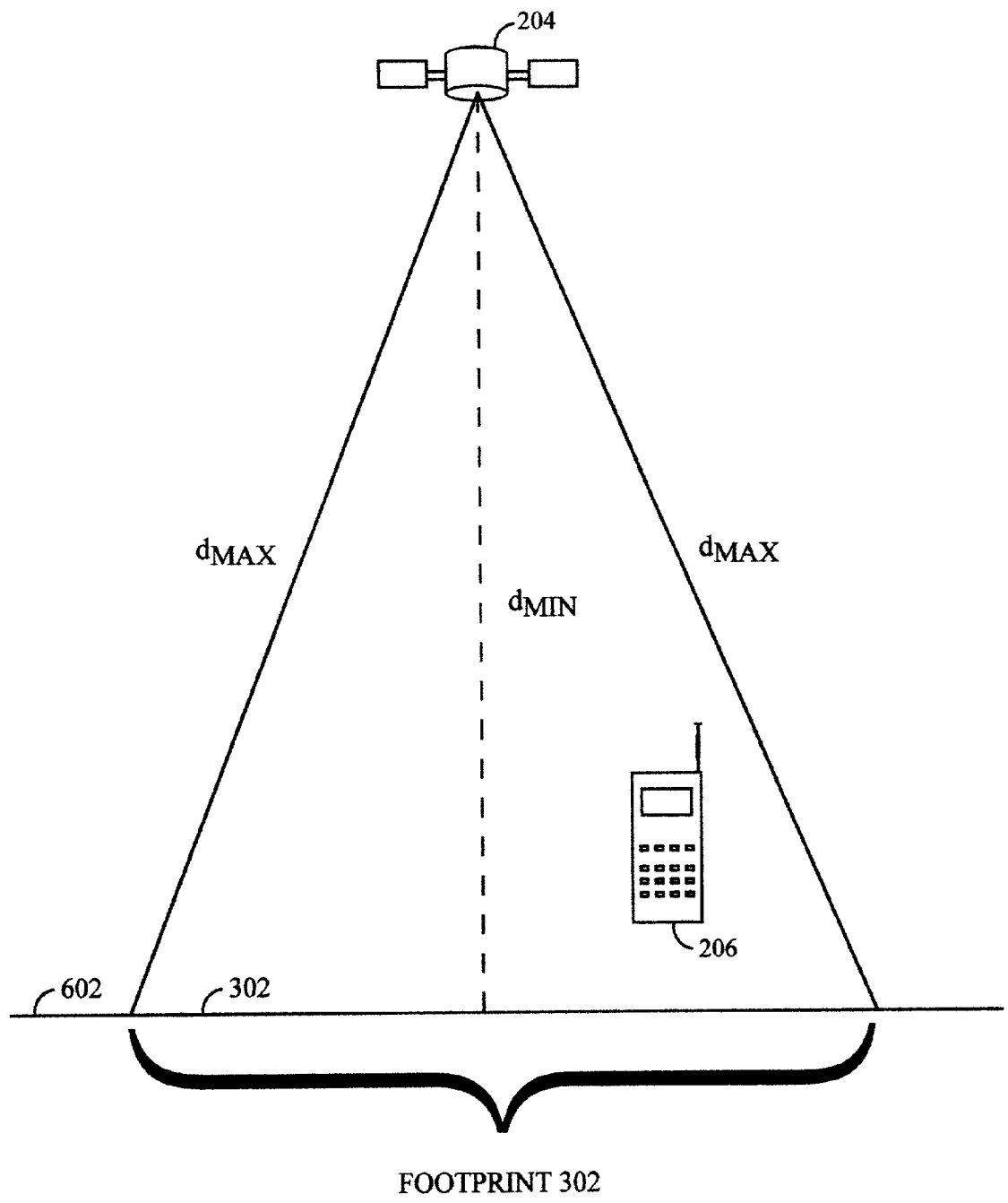
FIG. 6 illustrates distances between various points within a satellite's footprint and the satellite.

FIG. 6 illustrates the maximum and minimum distance between satellite 204 and user terminal 206, which is known to be within satellite 204's footprint 302. As shown in FIG. 6, the distance between user terminal 206 and satellite 204 is at a minimum when satellite 204 is directly overhead of user terminal 206, and the distance between user terminal 206 and satellite 204 is at a maximum when user terminal 206 is at the edge of footprint 302 (i.e., when the user terminal is at the minimum elevation angle), assuming a flat earth surface 602. In one embodiment, for example when a LEO satellite is used, $T_{us}$ is 4.72 ms when satellite 204 is directly above user terminal 206, and $T_{us}$ is 14.57 ms when user terminal 206 is at an elevation angle of 10 degrees relative to the satellite. For this embodiment, the time uncertainty is 2(14.57−4.72)=19.7 ms. This uncertainty represents the time uncertainty over the entire satellite footprint 302.

But because there is an access channel receiver 420 assigned to each beam within footprint 302, an access channel receiver 420 need not be concerned with the uncertainty over the entire footprint 302. An access channel receiver 420 need only be concerned with the uncertainty over the beam to which the access channel is assigned. The uncertainty corresponding to any given beam within footprint 302 is necessarily less than the uncertainty corresponding to the entire footprint 302.

Figure 7:
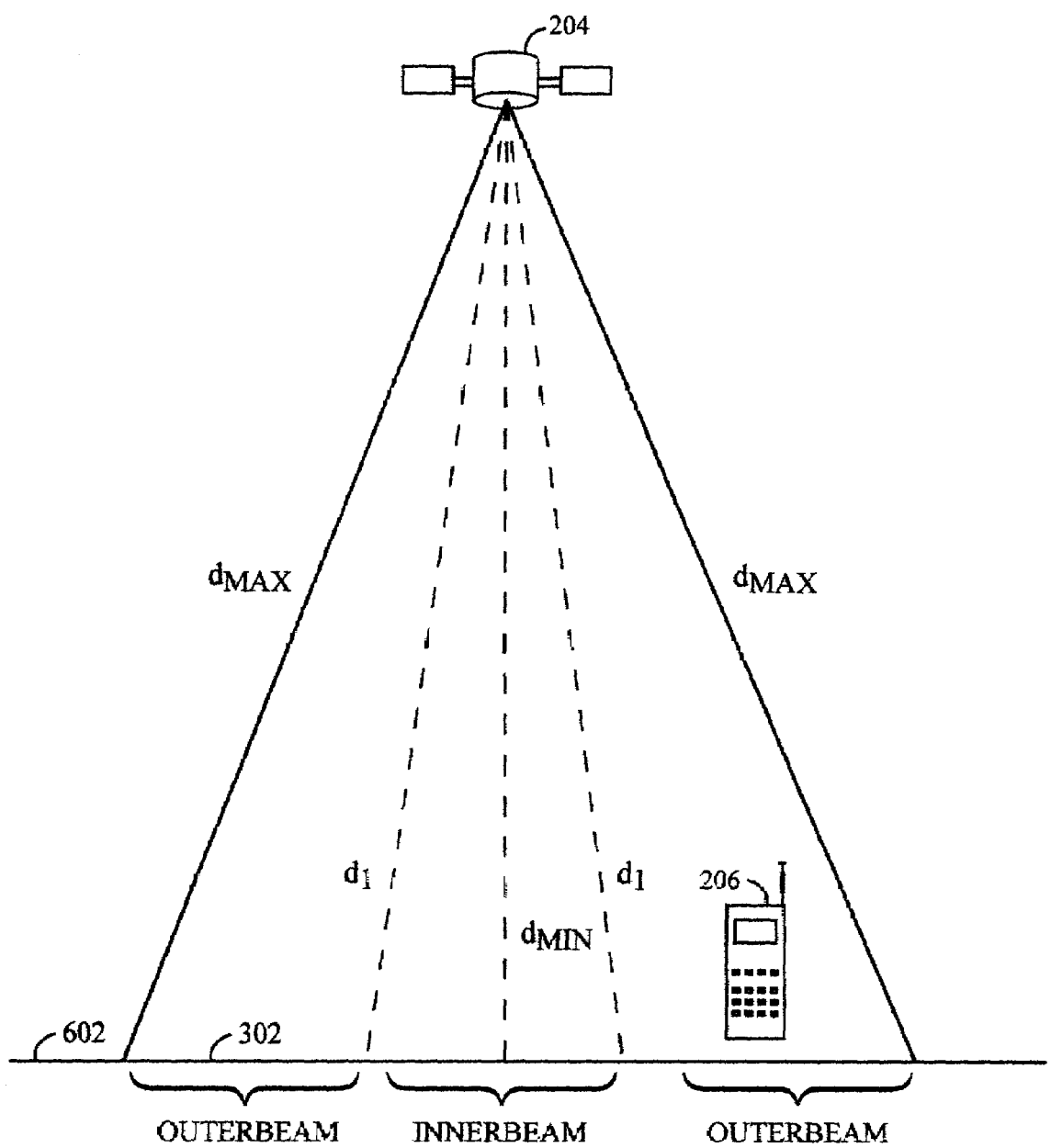
FIG. 7 illustrates distances between various points within a satellite's footprint and the satellite, and also illustrates inner and outer beam boundaries.

For example, consider FIG. 7, which illustrates distances between various points within satellite 204's footprint and satellite 204, assuming a flat earth surface 602. If user terminal 206 is within the inner beam (i.e., beam 1) of footprint 302, the distance between user terminal 206 and satellite 204 is at least $d_{min}$ and at most $d_1$. Since $d_1$ is less than $d_{max}$, the time uncertainty for the inner beam, which is proportional to $d_1-d_{min}$, is less than the time uncertainty over the entire footprint 302, which is proportional to $d_{max}-d_{min}$.

Similarly, if user terminal 206 is within an outer beam of footprint 302 (e.g., beams 2–16), the distance between user terminal 206 and satellite 204 is at least $d_1$ and at most $d_{max}$. Thus, the time uncertainty in an outer beam is less than the time uncertainty for the entire footprint 302 because $d_1$ is greater than $d_{min}$. Consequently, to reduce the search space assigned to an access channel receiver 420, an access channel receiver 420 is assigned a search space corresponding to the uncertainty associated with the beam to which the access channel receiver 420 is assigned, as opposed to assigning a search space corresponding to the uncertainty associated with the entire footprint 302.

VI. Frequency Search Space

Like the time uncertainty, the frequency uncertainty over the entire footprint 302 is greater than a frequency uncertainty over any individual beam. Consequently, to reduce the search space as much as possible, and thereby reduce the number of required hypotheses, the frequency search space assigned to a particular access channel receiver 420 corresponds only to the frequency uncertainty of the beam to which the receiver is assigned.

Frequency uncertainty is caused by Doppler as well as by uncertainty in frequency of the UT's local oscillator. The potential range of Doppler in a single beam depends on the coverage area of the beam relative to the position of satellite 204, and it is expected that the frequency uncertainty caused by the UT's local oscillator may be as large as +/−10 ppm.

Doppler uncertainty is incurred in both the reverse down-link 212 and the reverse up-link 214. The effects of the reverse down-link Doppler on access probe 410 can be determined by gateway 202 because gateway 202 tracks the position of satellite 204. But the effects of reverse up-link Doppler on access probe 410 cannot be determined because gateway 202 does not track or have accurate enough knowledge of the position of user terminal 206 with respect to satellite 204. However, it is possible to explicitly determine Doppler at all positions in the satellite's footprint 302 using the following relationship:

$$d^Y = -Rv\cos(\theta) \left\{ \frac{\sqrt{1-\left(\frac{R}{R+h}\cos(\eta)\right)^2}}{R\sin(\eta)-(R+h)\sqrt{1-\left(\frac{R}{R+h}\cos(\eta)\right)^2}} \right\}$$

$$\left( \frac{R\sin(\eta)\cos(\eta)}{\sqrt{h(2R+h)}+(R\sin(\eta))^2} - con(\eta) \right).$$

The above relationship provides the rate of change of the distance d (d) between a satellite and a user terminal 206 for a user terminal 206 seeing satellite 204 at an elevation η, and positioned at an azimuth of θ relative to the direction of the satellite's motion, where R is the radius of the earth, υ is the velocity of satellite 204, and h is the altitude of satellite 204 above earth surface 602. Consequently, the range of possible frequency shifts for any given access probe 410 can be determined, which provides the estimated boundaries for a useful frequency search space.

Preferably, the frequency uncertainty associated with each beam in footprint 302 is not determined based on the nominal beam coverage region, as one might expect. Instead, the frequency uncertainty for each beam is determined based on an area defined by a range of azimuths (θ) and a range of elevations (η) containing the nominal beam coverage region. For example, in one embodiment, the frequency uncertainty for each beam is determined based on the convex hull of a "3 dB" beam coverage region. The convex hull of a 3 dB beam coverage region is the smallest region defined by a rectangle in azimuth/elevation space that contains the 3 dB region.

Using the nominal boundaries of the beams, in which the inner beam extends from 10° to 60° in elevation and over an extent of 24° in azimuth, is not desired because of the anticipated tendency of the beam shapes to distort as satellite hardware ages. The 3 dB coverage region approach leads to overlapping search areas, thereby avoiding the beam distortion problem and possibly conferring diversity advantages. A 3 dB beam coverage region is the region in which a user transmitting a signal at 0 dB can attain an $E_b/N_t$ (i.e., signal-to noise-ratio) of at least 3 dB on the beam at gateway 202, where $E_b$ is the energy-per-bit of the signal and $N_t$ is the total noise. It should be noted that the invention is in no way limited to the 3 dB beam coverage region. The 3 dB beam coverage region is but one example of a region defined by a range of azimuths and a range of elevations containing the nominal beam coverage region.

Figure 8:
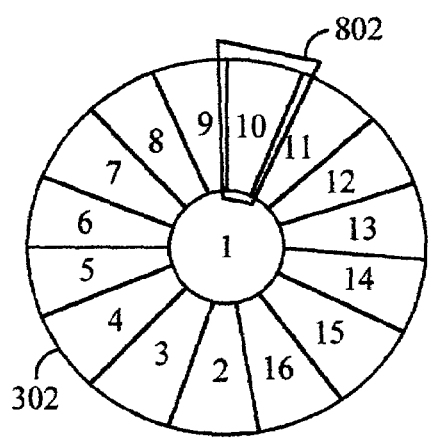
FIG. 8 illustrates an exemplary 3dB beam coverage area.

FIG. 8 illustrates an example 3 dB beam boundary 802. As shown in FIG. 8, the 3 dB coverage area 802 for beam 10 is greater than beam 10's nominal coverage area and overlaps onto beams 1, 9, and 11. By overlapping the beams in this way, the probability that a transmitting user terminal 206 will not be detected has been significantly reduced.

Using the convex hull of a 3 dB beam boundary and the above relationship, one can determine the maximum and minimum Doppler for each beam, assuming that each access channel receiver 420 knows the exact nominal azimuth of the beam on which it is searching. In a preferred embodiment, each access channel receiver 420 receives the nominal azimuth of the beam on which it is searching from a satellite geometry unit (not shown) at the gateway 202. This information is received at intervals of one minute; as a result, there is an uncertainty in azimuth of +/−5 degrees, which is the maximum effect of yaw steering within one minute.

The total frequency uncertainty associated with each beam is determined by summing the frequency uncertainty introduced by the UT's local oscillator, and the Doppler uncertainty, which includes the uncertainty introduced by the azimuth uncertainty due to yaw steering. Once the total frequency uncertainty is determined for each beam, a frequency search space can be assigned to each access channel receiver 420. A frequency search space assigned to an access channel receiver 420 corresponds with the total frequency uncertainty of the beam to which the access channel receiver 420 is assigned.

According to one embodiment, the frequency uncertainty over the entire satellite footprint 302 is 95 KHz, the frequency uncertainty over the inner beam is 68 KHz, and the frequency uncertainty for the outer beams is 57 KHz. The frequency uncertainty over the outer beams is significantly less than the frequency uncertainty over the entire satellite footprint 302. Therefore, smaller search spaces are searched by considering the frequency and time uncertainties over individual beams rather than over the entire satellite footprint 302. Smaller search spaces mean that fewer hypotheses need be compared to access probe 410, which means that access probe 410 can be acquired using less hardware.

VII. Access Probe Details

Figure 9:
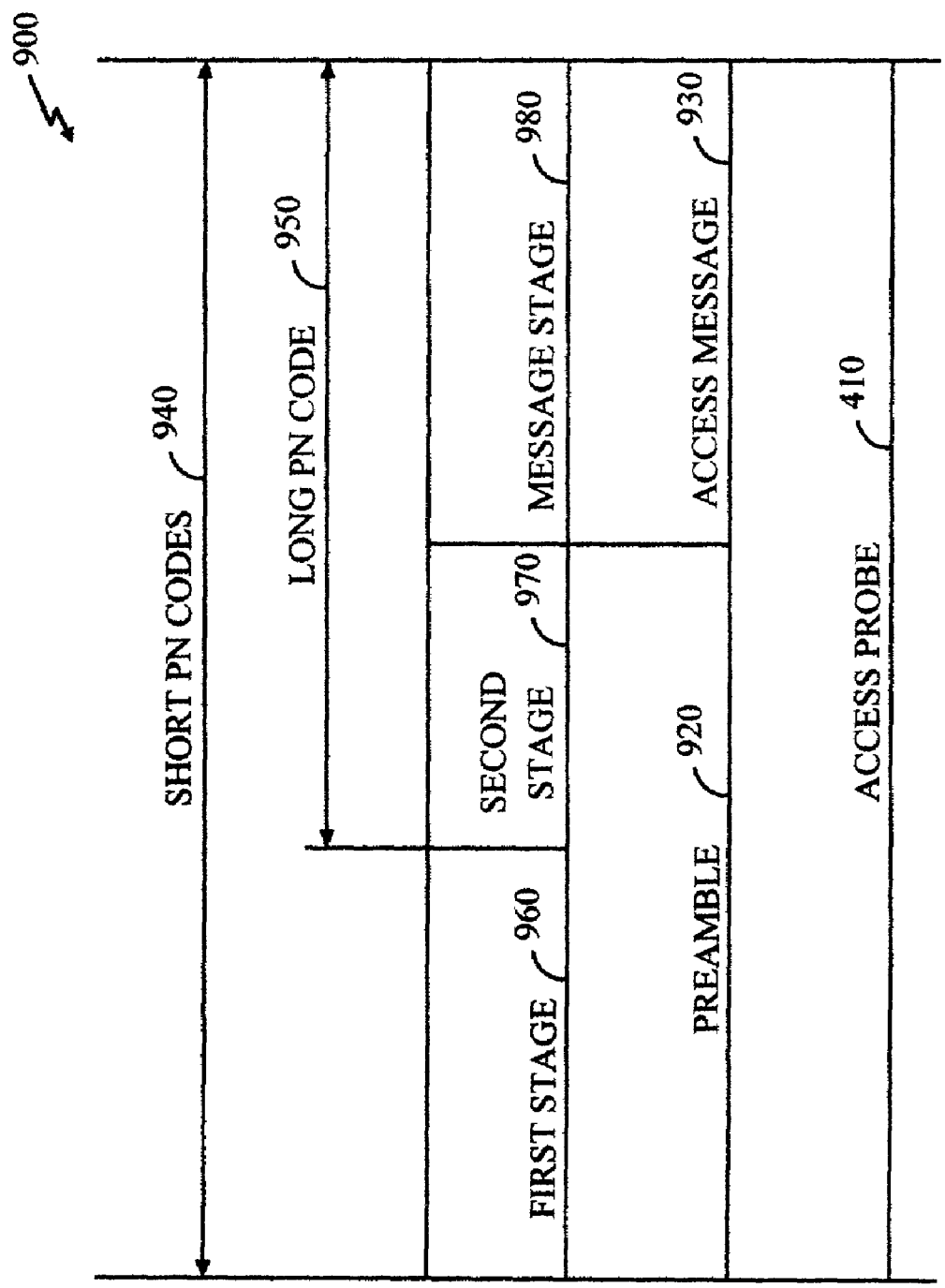
FIG. 9 illustrates an exemplary access probe structure.

FIG. 9 illustrates an access probe structure 900. Access probe 410 includes an access probe preamble (preamble) 920 and an access probe message (access message) 930. Access probe preamble 920 contains null data (e.g., all "1's" or all "0's"). Access probe message 930 contains meaningful information.

According to the present invention, preamble 920 is transmitted in two stages: a first stage preamble 960, and a second stage preamble 970. First stage preamble 960 is modulated only by a short PN code pair 940. Second stage preamble 970 is modulated by both the short PN code pair 940 and a long PN code 950. After user terminal 206 transmits second stage preamble 970, message stage 980 is transmitted by the user terminal. Message stage 980 is the modulated access message 930, where the access message 930 is modulated by both short PN code pair 940 and long PN code 950. By transmitting preamble 920 in stages, the number of hypotheses required to resolve the frequency and timing uncertainty and acquire access probe 410 is reduced.

According to one embodiment, frequency uncertainty is resolved during the transmission and reception of first stage preamble 960 while timing uncertainty is completely resolved during the transmission of second stage preamble 970. A system for transmitting access probe 410 is described in the above mentioned copending U.S. Application Ser. No. 09/098,631.

VIII. Acquiring an Access Probe

Figure 10:
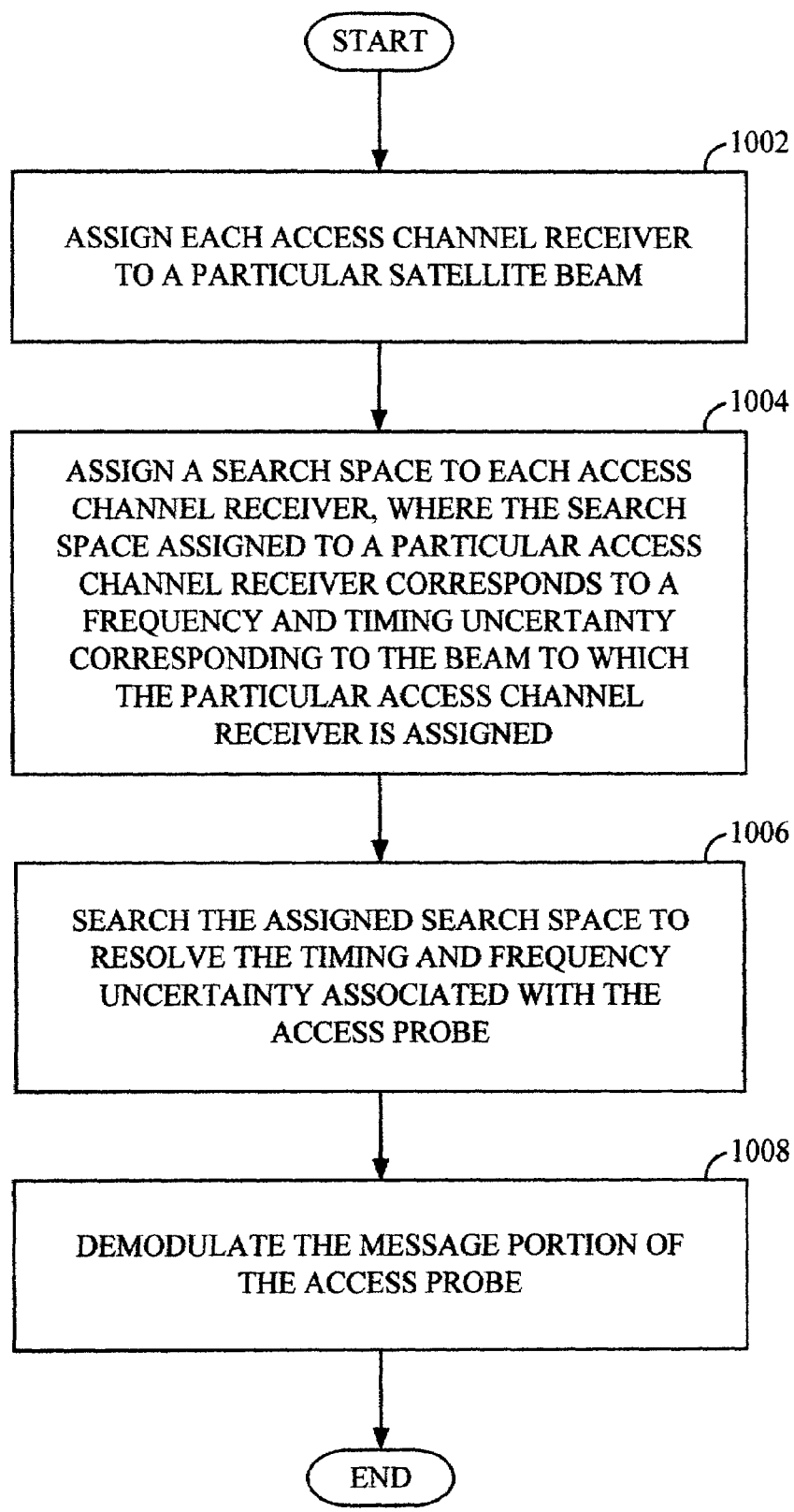
FIG. 10 illustrates an exemplary process for acquiring an access probe.

FIG. 10 illustrates a process according to one embodiment for acquiring access probe 410 at gateway 202. The process begins in step 1002. In step 1002, each access channel receiver 420 is assigned to a particular beam projected from satellite 204. A search space is then assigned to each access channel receiver 420 (step 1004). The search space assigned to a particular access channel receiver 420 corresponds to a frequency and timing uncertainty corresponding to the beam to which the particular access channel receiver 420 is assigned. The frequency and timing uncertainty is determined as described above with reference to FIGS. 6–8.

Next, the access channel receiver 420 searches its assigned search space to resolve the timing and frequency uncertainty associated with the access probe 410 (step 1006). That is, it correlates access probe 410 with various time and frequency hypothesis pairs, wherein all of the various time and frequency hypothesis pairs define a point within the assigned search space. The searching process is described in more detail below with reference to FIG. 12. Lastly, the message portion of the access probe 410 is demodulated using a frequency increment and timing offset obtained as a result of resolving the timing and frequency uncertainty associated with the access probe 410 (step 1008).

IX. Access Channel Receiver

In one embodiment, each access channel receiver 420 includes eight gateway demodulators (GDMs) to perform the search for an access probe over the assigned search space. In this embodiment, the search space corresponds to the frequency and time uncertainty introduced over the entire satellite footprint 302. In a preferred embodiment, each access channel receiver includes only four GDMs for performing access probe acquisition. In the preferred embodiment, the search space corresponds to the frequency and time uncertainties over individual beams rather than over the entire satellite footprint 302. Consequently, by considering the frequency and timing uncertainty over individual beams rather than over the entire footprint 302 and by holding the search time constant, fewer GDMs are required to perform the search.

Figure 11:
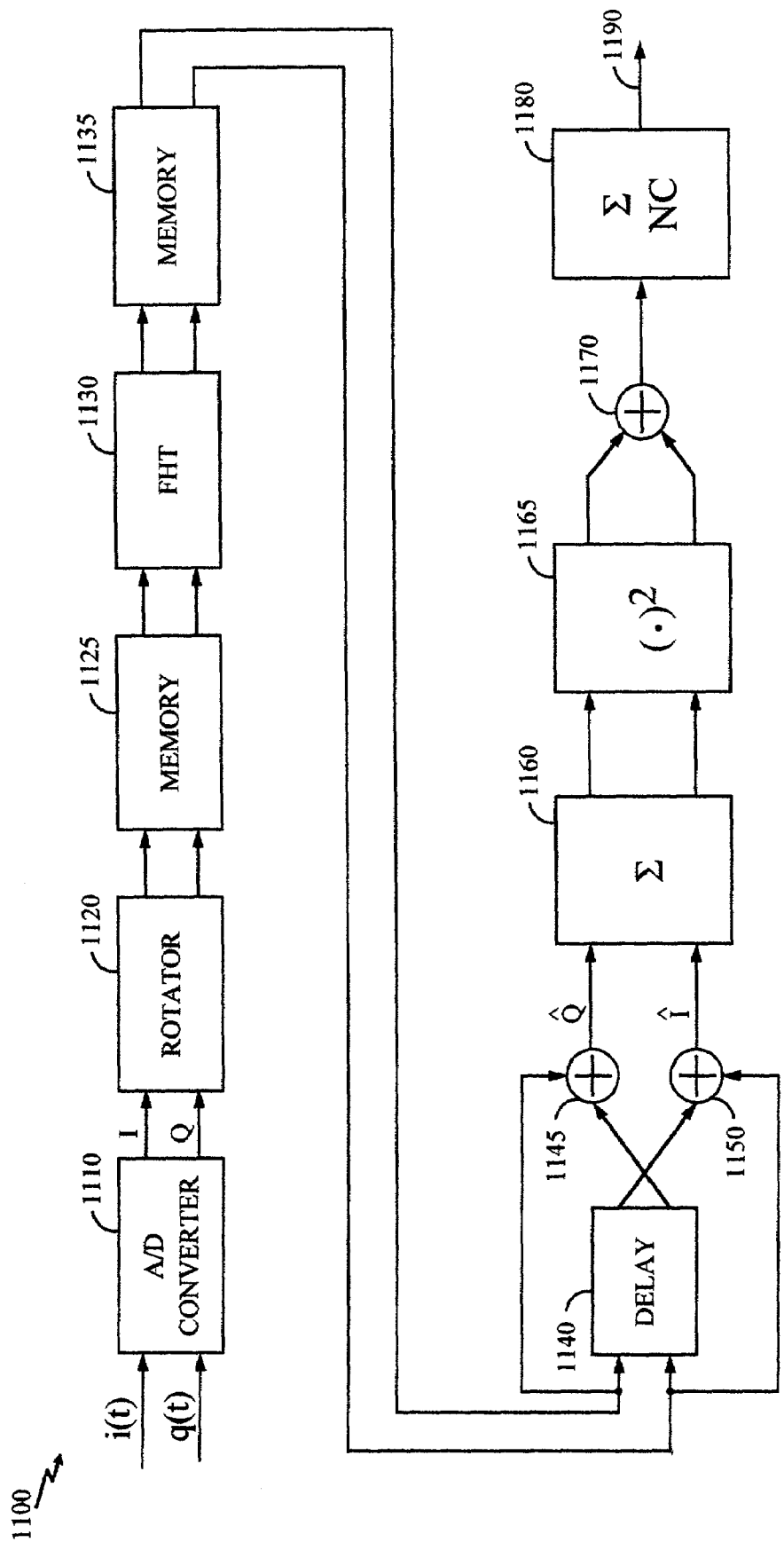
FIG. 11 is a block diagram illustrating a gateway demodulator according to one embodiment.

FIG. 11 is a block diagram illustrating an exemplary GDM 1000, according to one embodiment. GDM 1100 includes an analog-to-digital (A/D) converter 1110, a rotator 1120, a first memory 1125, a fast Hadamard transformer (FHT) 1130, a second memory 1135, a delay 1140, summers 1145 and 1150, a coherent integrator 1160, a squaring operator 1165, a channel summer 1170, and a non-coherent integrator 1180.

A/D converter 1110 receives I,Q channel signals from antenna 203 and quantizes the received signals. Rotator 1120 adjusts the frequency of the received signals in order to remove the frequency uncertainty in the received signals as a result of Doppler or other known effects.

The output from rotator 1120 is stored in memory 1125. FHT 1130 performs a fast Hadamard transformation (FHT) operation according to well known techniques. The output from FHT 1130 is stored in memory 1135. Memory 1125 and memory 1135 operate according to a well known process that permutes data before and after the FHT operation. This process quickly and efficiently determines the possible number of offsets for the short PN code pair 940 in view of the possible timing uncertainty. The output of memory 1125, FHT 1130, and memory 1135 is the periodical autocorrelation of short PN code pair 940.

The remaining portions of GDM 1100 compute the energy of the received signal according to well known communication techniques. Delay 1140 and summer 1145, 1150 compute estimates of the in phase and quadrature components of the received signal. Coherent integrator 1160 accumulates each of the in phase and quadrature components over a preselected period. Typically, this period corresponds to a symbol period. Squaring operator 1165 determines a magnitude for each of the accumulated components by squaring the components. These magnitudes are referred to as coherent sums. Channel summer 1170 combines the two coherent sums from the in phase and quadrature channels. Non-coherent integrator 1180 accumulates the combined coherent sums over an interval commencing and ending at Walsh code boundaries to provide a non-coherent combination of sums 1190. Walsh codes are orthogonal channelizing codes that are used in forming the received signal. Walsh codes permit multiple users to share a single frequency band (CDMA channel). Non-coherent sum 1190 is related to the net energy of the communication signal correlated or despread with a particular timing offset of short PN code pair 940. Non-coherent sum 1190 varies in value depending on whether or not a timing offset of short PN code pair 940 corresponds to that of the communication signal being acquired.

Non-coherent sum 1190 is compared with one or more thresholds (not shown) to establish a minimum energy level for determining proper signal correlation and, thus, frequency and timing alignment. When non-coherent sum 1190 exceeds the one or more thresholds, the timing offset of short PN code pair 940 is the selected timing offset that is subsequently used for tracking and demodulating the communication signal. If non-coherent sum 1190 does not exceed the threshold, a new timing offset (i.e., another hypothesis) is tested and the aforementioned accumulation and thresholding operations are repeated.

X. The Searching Process

Figure 12:
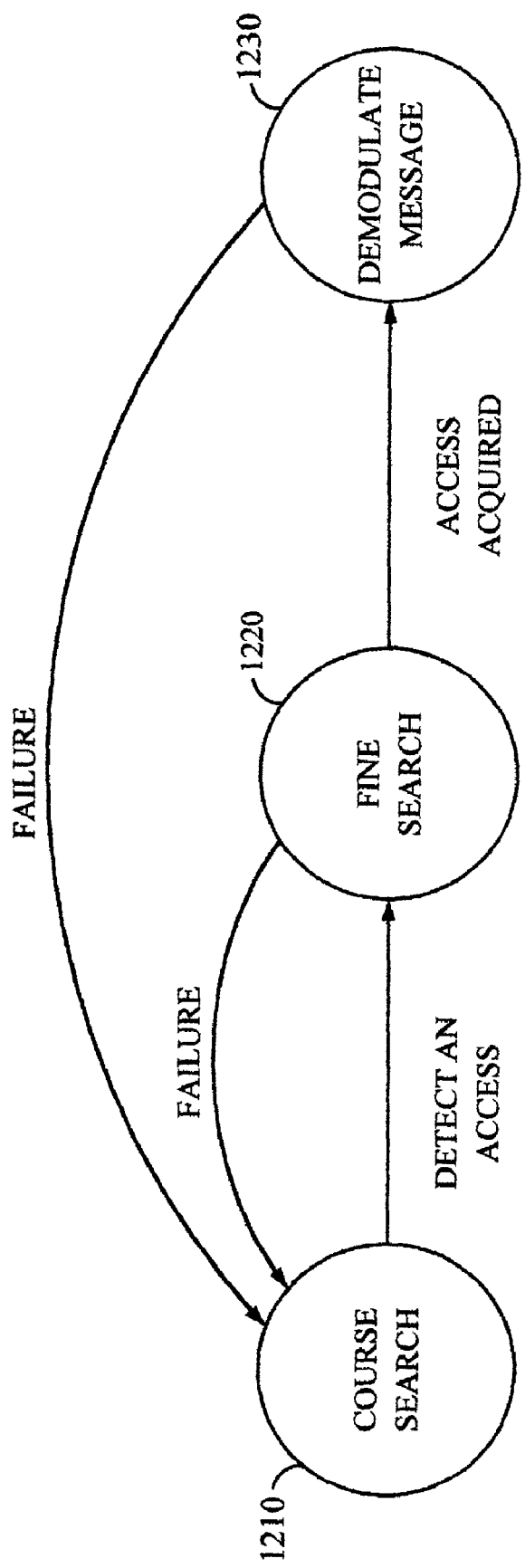
FIG. 12 is a state diagram illustrating the operation of the gateway demodulator of FIG. 11 according to one embodiment.

FIG. 12 is a state diagram illustrating the operation of one embodiment of GDM 1100. The state diagram includes a coarse search state 1210, a fine search state 1220, and a demodulate message state 1230.

GDM 1100 begins operating in coarse search state 1210. During coarse search state 1210, GDM 1100 performs a coarse search for access probe 410. According to a preferred embodiment, a coarse search comprises a search in time and a search in frequency over the search space assigned to GDM 1100. In the preferred embodiment, the search space assigned to GDM 1100 corresponds to the time and frequency uncertainty over an individual beam as opposed to over the entire satellite footprint 302.

The search in time attempts to lock onto short PN code pair 940 used in access probe 410. In particular, this search attempts to determine the timing offset of short FN code pair 940. The search in frequency attempts to resolve the frequency uncertainty in access probe 410. The searches in time and frequency can be performed in either series or parallel. Because the timing uncertainty is expected to be larger than the frequency uncertainty, one embodiment performs a parallel search in time and a serial search in frequency. This embodiment is particularly useful when FHT 1130 is available in GDM 1100. In this embodiment, rotator 1120 increments frequency by a predetermined amount based upon a predetermined range of frequency uncertainty. At each frequency increment, FHT 1130 performs a parallel search for the timing of short PN code pair 940. A particular frequency increment and a particular timing of short PN code pair 940 maximize output 1190 out of non-coherent integrator 1180. If the maximum output 1180 exceeds a predetermined threshold, coarse search has detected access probe 410. When this occurs, the particular frequency increment resolves the frequency uncertainty and the timing of short PN code pair 940 partially resolves the timing uncertainty.

If the maximum output 1190 does not exceed a predetermined threshold, coarse search has not detected access probe 410. In this event, GDM 1100 remains in coarse search state 1210.

Upon detecting access probe 410, GDM 1100 changes from coarse search state 1210 to fine search state 1220. Upon changing from coarse search state 1210 to fine search state 1220, GDM 1100 changes characteristics in order to acquire long PN code 950. In particular, memories 1125, 1135 and FHT 1130 are different for long PN code 950 than they are for short PN code pair 940. According to one embodiment, memories 1125, 1135 and FHT 1130 are reconfigured to search for long PN code 950.

During fine search state 1220, GDM 1100 performs a fine search. According to a preferred embodiment, a fine search consists of a search in time over the determined arrival time uncertainty space. The fine search attempts to lock onto long PN code 950 used in access probe 410. During the fine search, the particular frequency increment and the timing of short PN code pair 940 obtained during coarse search state 1210 are used to completely resolve the timing uncertainty in access probe 410.

A similar process to that described above with respect to the coarse search is used to acquire or lock on to long PN code 950. A particular timing of long PN code 950 maximizes output 1190 out of non-coherent integrator 1180. If the maximum output 1190 exceeds a predetermined threshold, fine search has acquired access probe 410. When this occurs, the particular timing of long PN code 950 completely resolves the timing uncertainty.

If the maximum output 1190 does not exceed a predetermined threshold, the fine search fails to acquire access probe 410. In this event, GDM 1100 changes from fine search state 1220 to coarse search state 1210 to attempt to detect access probe 410.

Upon acquiring access probe 410, GDM 1100 changes from fine search state 1220 to demodulate message state 1230. During demodulate message state 1230, GDM 1100 demodulates the message 930 included in access probe 410 using the particular frequency increment and the timing obtained during fine search state 1120. By demodulating message 930, the information contained therein is recovered.

If output 1190 drops below a predetermined threshold during demodulate message state 1230, GDM 1100 has lost acquisition of access probe 410. This occurs in a variety of circumstances including completion of the transmission of access probe 410 or some failure. Regardless of the cause, GDM 1100 changes from demodulate message state 1230 to coarse search state 1210 to attempt to detect access probe 410.

XI. CONCLUSION

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claim as our invention is:

1. A communication station for acquiring an access probe signal transmitted by a beam source corresponding to a range of frequency and timing uncertainty of the access probe signal arrival, the communication station comprising:
    a plurality of receiver means, each receiver means searching for the access probe signal within an assigned search space to resolve the frequency and timing uncertainty; and
    means for assigning a search space to the plurality of receiver means, each search space corresponding to one of the plurality of beams from the beam source and each beam corresponding to a reduced range of frequency and timing uncertainty of the access probe signal arrival.

2. The communication station of claim 1, wherein the beam source is a satellite.

3. The communication station of claim 2, wherein the satellite is a low earth orbit satellite.

4. The communication station of claim 2, wherein the access probe signal is from a user terminal and is relayed by the satellite to the communication station, and wherein the time uncertainty corresponding to each beam is defined by maximum and minimum distances between the user terminal and the satellite within a coverage region of each beam.

5. The communication station of claim 2, wherein the access probe signal is from a user terminal and is relayed by the satellite to the communication station, and wherein the frequency uncertainty corresponding to each beam is defined by a range of azimuths and a range of elevations containing a nominal coverage region of each beam.

6. The communication station of claim 1, wherein the beam source is a base station.

7. The communication station of claim 1, wherein the access probe signal comprises a preamble and a message portion.

8. The communication station of claim 7, wherein each receiver means comprises:
   means for performing a coarse search to resolve the frequency uncertainty of the access probe signal; and
   means for performing a fine search to resolve the timing uncertainty of the access probe signal.

9. The communication station of claim 8, wherein the means for performing a coarse search comprises means for performing, in serial, a search in frequency over the assigned search space.

10. The communication station of claim 8, wherein the means for performing the coarse search comprises means for performing, in parallel, a search in time over the assigned search space.

11. The communication station of claim 7, wherein each receiver means comprises;
   a means for correlating the access probe signal with various frequency and timing hypothesis pairs defined within the assigned space;
   means for determining a highest correlation to resolve the frequency and timing uncertainty by setting a hypothesis pair corresponding to the highest correlation as an arrival frequency and timing of the access probe signal; and
   means for demodulating the message portion based on a result of resolving the arrival frequency and timing uncertainty.

12. A gateway comprising:
   a plurality of receiver means, each receiver means searching for a access probe signal within an assigned search space to resolve a frequency and timing uncertainty of the access probe signal arrival; and
   means for assigning a search space to the plurality of receiver means, each search space corresponding to one of the plurality of beams from a satellite corresponding to a range of frequency and timing uncertainty of the access probe signal arrival, and each beam corresponding to a reduced range of frequency and timing uncertainty of the access probe signal arrival.

13. The gateway of claim 12, wherein the satellite is a low earth orbit satellite.

14. The gateway of claim 12, wherein the access probe signal is from a user terminal and is relayed by the satellite to the gateway, and wherein the time uncertainty corresponding to each beam is defined by a maximum and minimum distances between the user terminal and the satellite within a coverage region of each beam.

15. The gateway of claim 12, wherein the access probe signal is from a user terminal and is relayed by the satellite to the gateway, and wherein the frequency uncertainty corresponding to each beam is defined by a range of azimuths and a range of elevations containing a nominal coverage region of each beam.

16. The gateway of claim 12, wherein the access probe signal comprises a preamble and a message portion.

17. The gateway of claim 16, wherein each receiver means comprises:
   means for performing a coarse search to resolve the frequency uncertainty of the access probe signal; and
   means for performing a fine search to resolve the timing uncertainty of the access probe signal.

18. The gateway of claim 17, wherein the means for performing a coarse search comprises means for performing, in serial a search in frequency over the assigned search space.

19. The gateway of claim 17, wherein the means for performing the coarse search comprises means for performing, in parallel, a search in time over the assigned search space.

20. The gateway of claim 16, wherein each receiver means comprises:
   a means for correlating the access probe signal with various frequency and timing hypothesis pairs defined within the assigned space;
   means for determining a highest correlation to resolve the frequency and timing uncertainty by setting a hypothesis pair corresponding to the highest correlation as an arrival frequency and timing of the access probe signal; and
   means for demodulating the message portion based on a result of resolving the arrival frequency and timing uncertainty.

21. A communication station for acquiring a signal, the communication station having a coverage region corresponding to a range of arrival frequency and timing uncertainty of the signal, the communication station comprising:
   a plurality of receiver means, each receiver means searching for the signal within an assigned search space to resolve the frequency and timing uncertainty; and
   means for assigning a search space to the plurality of receiver means, each search space corresponding a coverage region corresponding to a reduced range of arrival frequency and timing uncertainty of the signal.

22. The communication station of claim 21, wherein the signal is an access probe signal.

23. A communication station for acquiring an access probe signal relayed by a beam source corresponding to a range of frequency and timing uncertainty of the access probe signal arrival, the communication station comprising:
   a plurality of receiver means, each receiver means searching for the access probe signal within an assigned search space to resolve the frequency and timing uncertainty; and
   means for assigning a search space to the plurality of receiver means, each search space corresponding to one of the plurality of beams from the beam source and each beam corresponding to a reduced range of frequency and timing uncertainty of the access probe signal arrival.

24. The communication station of claim 23, wherein the beam source is a satellite.

* * * * *